[11] 3,581,099

| [72] | Inventor | Georg G. F. Franke Wetzlar, Germany |
|---|---|---|
| [21] | Appl No | 711,314 |
| [22] | Filed | Mar. 7, 1968 |
| [45] | Patented | May 25, 1971 |
| [73] | Assignee | Ernst Leitz GmbH Wetzlar, Germany |
| [32] | Priority | Mar. 10, 1967 |
| [33] | | Germany |
| [31] | | L55,966 and IXa/42h |

[54] TORIC IMAGING LENS FOR SLOT CENSORS FOR SATELLITES
4 Claims, 10 Drawing Figs.

[52] U.S. Cl. .................................................. 250/216,
250/203, 250/237, 350/191, 350/198
[51] Int. Cl. ........................................................ H01j 3/14,
H01j 5/16, G02b 3/06, G02b 13/01
[50] Field of Search ................................................ 350/198,
191, 190; 250/203, 206, 227

[56] References Cited
UNITED STATES PATENTS
| 2,561,508 | 7/1951 | Gregorie et al. ............... | 250/227X |
| 3,040,661 | 6/1962 | Ross ............................... | 350/191X |
| 3,062,964 | 11/1962 | Lubin ............................ | 250/227 |
| 3,361,512 | 1/1968 | Fuller ........................... | 350/190 |
| 3,411,011 | 11/1968 | Genahr et al. ................ | 250/227 |
| 3,423,593 | 1/1969 | Chinnock ..................... | 250/203X |

*Primary Examiner*—John Kominski
*Assistant Examiner*—V. Lafranchi
*Attorney*—Krafft and Wells ABSTRACT: Five embodiments of slot sensors for stabilizing the position of a satellite in space are disclosed. All embodiments comprise a glass body having a refractive circumferential surface of 180° angular aperture. In the image plane of the refractive surface is disposed a slot diaphragm, the slot of which is arranged to coincide with the center plane of said glass body. Behind the slot diaphragm there is provided a photoelectric receiver which is sensitive to the electromagnetic rays which are incident on the sensor.

In the different embodiments the slot diaphragms are shown to be positioned either in front of or behind the center of rotation of the toric glass body (in the direction of light travel) depending on the radius of the toric shape and on the refractive index of the glass.

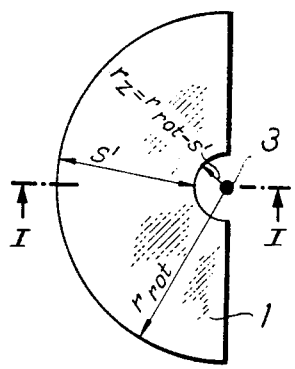
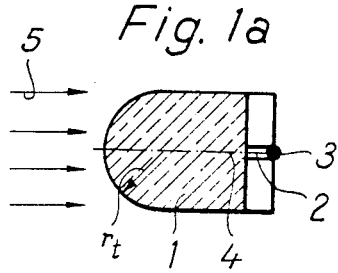
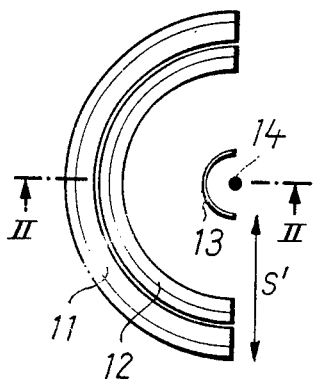
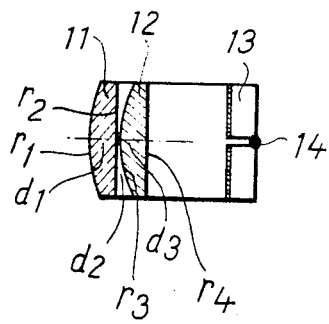
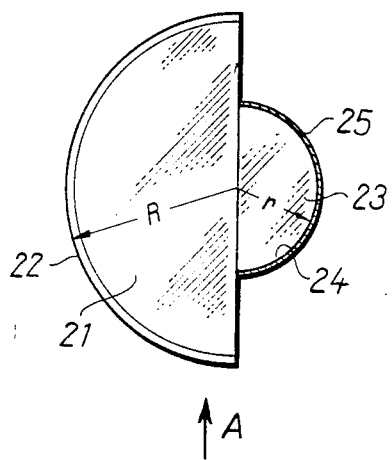
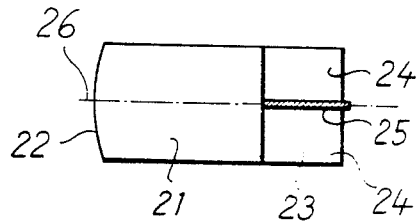
INVENTOR
GEORG G. F. FRANKE
By Krafft & Wells
ATTORNEYS Fig. 4
Fig. 4a
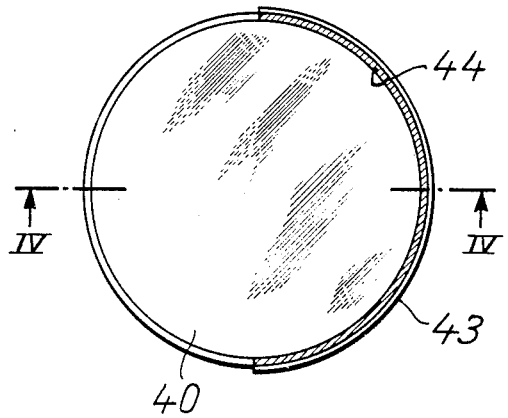
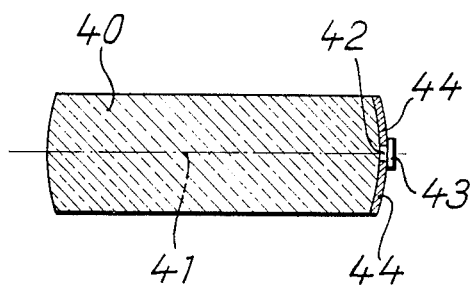
Fig. 5
Fig. 5a
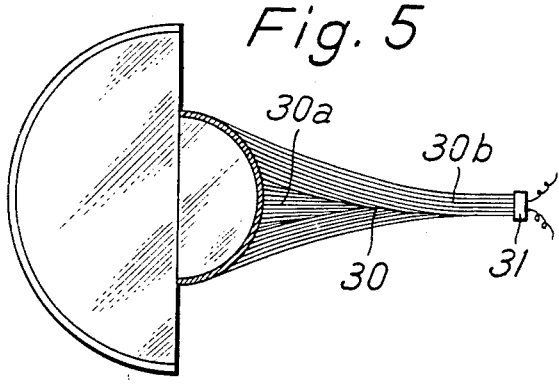
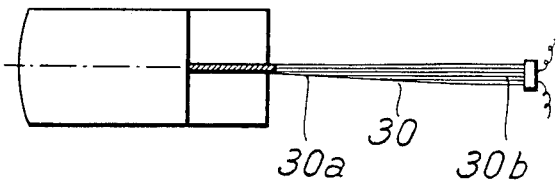
INVENTOR
GEORG G. F. FRANKE
By Krafft & Wells
ATTORNEYS

3,581,099

TORIC IMAGING LENS FOR SLOT CENSORS FOR SATELLITES

CROSS-REFERENCE TO RELATED APPLICATION

Applicant claims priority under 35 USC 119 for application No. L 55 966 IXa/42h, filed Mar. 10, 1967 in the Patent Office of the Federal Republic of Germany.

BACKGROUND OF THE INVENTION

1. Field of the Invention

The present invention relates to optical devices used for determining and controlling the position in space of satellites.

2. Description of the Prior Art

In order to stabilize the attitude of satellites in the orbit it is known in the art to cause the satellites to rotate about their longitudinal axis. This results in a gyrostatic effect by which stabilization of the axis is achieved. For determination of the position of the satellite axes relative to the flight path usually slot sensors are used which register the cutting of the meridian, for example of the earth or of the sun, regardless of the altitude. The pulses obtained from the sensor are utilized for correcting the axes positions or, particularly with communication satellites, for electrically connecting at a given time this antenna which faces the earth.

The optical devices for slot sensors as known in the art and previously used are rather complicated and, moreover, rather heavy. It is this heavy weight that is particularly disadvantageous for use in satellites.

For the projection of great circles in a planetarium, however, it is already known to use an illuminated slot diaphragm which extends through an angle of 360° and which is projected on the projection screen of the planetarium. This known optical device consists of a toric glass body having a cylindrical bore. In the center of the bore a light source is arranged and the wall of the bore is provided with an annular slot which is projected to infinity by the toric glass surface.

SUMMARY OF THE INVENTION

It is therefore an object of the present invention to overcome the above-outlined disadvantage and to provide for use in satellites a slot sensor which is comparatively light in weight.

It is a further object to provide a slot sensor which is simple in design, rugged and reliable in working performance.

These objects are attained according to the invention by providing a toric glass body of 180° angular aperture and by disposing a slot diaphragm in the image plane and at the same time in the center plane of the glass body and, further, by arranging a photoelectric receiver behind said slot diaphragm.

According to this principle various modifications of slot sensors may be designed as will be described in more detail hereinafter. All embodiments, however, show the above-mentioned features. All variations and modifications depend solely on the radius of the toric shape of the glass body and of the refractive index of the glass used.

DESCRIPTION OF THE DRAWINGS

The invention will be more readily comprehended from the following description when taken in conjunction with the appending drawings, wherein:

FIG. 1 shows the basic design of a slot sensor according to the invention,

FIG. 1a is a cross-sectional view along line I–I in FIG. 1,
FIG. 2 shows a first modification of the basic design,
FIG. 2a is a cross-sectional view along line II–II in FIG. 2,
FIG. 3 shows a modification of the basic design,
FIG. 3a is a side view in the direction of arrow A in FIG. 3,
FIG. 4 shows another modification of the basic design,
FIG. 4a is a cross-sectional view along line IV–IV in FIG. 4,
FIG. 5 shows a modification of the basic design wherein an optical fiber bundle is used for transmitting the light from the slot to the photoelectric receiver,
FIG. 5a is a side view in the direction of arrow B in FIG. 5.

DESCRIPTION OF THE PREFERRED EMBODIMENTS

Referring now to FIG. 1 which illustrates the basic design of a slot sensor according to the invention there is provided a toric glass body 1 having a radius of rotation $r_{rot}$ and extending through an angle of 180°. The toric shape is defined by the radius $r_t$ as can be seen from FIG. 1a.

Concentrically to the center of radius $r_{rot}$ the glass body is provided with a cylindrical recess having the radius $r_z$. The latter radius $r_z$ equals the difference of $r_{rot}$−$s'$, whereat $s'$ represents the back focal distance of the refracting toric surface. The refractive power of this surface, of course depends directly on the length of radius $r_t$ and the refractive index of the glass.

The wall of the central cylindrical recess is opaque except for a slot 2 which is arranged in the center plane 4 of the glass body 1 and which also extends through an angle of 180°. Slot 2 thus has the effect of an aperture in a diaphragm.

In the center of rotation is disposed a photoelectric receiver 3. All light rays 5 which impinge on the toric surface in parallel to the center plane 4 pass through slot 2 and are incident on said receiver from which a pulse will be obtained whenever the center plane of the sensor cuts the meridian, for example of the sun.

In FIG. 2 is illustrated a modification of the above-described basic design. In this embodiment the toric glass body 1 of FIG. 1 is replaced by two ring lenses 11 and 12. The outer surfaces of both lenses are spherical while their inner surfaces are cylindrical. An air space is provided between both lenses.

A slot diaphragm 13 is disposed concentrically to the lenses 11 and 12. In this embodiment the diaphragm 13 has the same effect as cylindrical recess wall and slot 2 in the embodiment according to FIG. 1. The slot in diaphragm 13 coincides with the back focal line of the lenses 11 and 12 and is in the center plane 4. A photoelectric receiver 14 is arranged in the center of the device.

Below are listed in millimeters the radii, thickness, and spacings of the two ring lenses of one specific embodiment according to FIGS. 2 and 2a. The refractive index of the glass is assumed to be $n=1.50$ and the given data are to be read in conjunction with FIG. 2a. From said data it will be found that the radius of the slot diaphragm 13 is 11 mm.

$r_1 = 60$
$d_1 = 10$
$r_2 \text{ (cyl)} = 50$
$d_2 \text{ (air)} = 1$
$r_3 = 49$
$d_3 = 9$
$r_4 \text{ (cyl)} = 40$
$s' = 29$ It is, however, emphasized that these data are given only by way of example. Other embodiments rendering the same effect can readily be designed.

For the purpose of correcting aberrations it may be advisable to introduce spherical surfaces. An embodiment making use of such spherical surfaces is illustrated in FIGS. 4 and 4a. The material used in this embodiment is glass having an index of refraction $n=2.00$.

Both Figures show a disc 40 cut from a ball in such a way that the center plane 41 of the disc extends through the center of the ball. One side of the ball surface is covered by an opaque layer 44 through an angle of 180°, which layer, however, has a small slot 42 through which light may impinge on the photoelectric receiver 43 which extends semiannularly around disc 40. The photoelectric receiver may, of course, be positioned directly on the disc surface, if the receiver is prepared, for example, by cathodic sputtering.

The embodiment of FIG. 4 is based on the principle according to which the focal length, i.e. the back focal distance in the glass, equals $(n \cdot r)/(N-1)$. Thus, if there is $n=2.00$, as was previously assumed, the back focal distance will be $2r$, which means that the sensor can be disc-shaped with the photoelectric receiver attached to one-half of the circumference, where it coincides with the focal line of the uncovered surface.

Slot sensors are frequently designed to be operated with rays from the infrared spectral region. With these rays material having an even higher refractive index than $n=2.00$ may be used like, for example, germanium which has a refractive index of $n=4.00$. The device may then be assembled from two disc halves as illustrated by FIGS. 3 and 3a.

The disc 21 is again cut from a ball in such a way that the central plane 26 extends through the ball center. In contradistinction to the embodiment depicted in FIG. 4 in the present embodiment only one-half of the disc as cut from the ball is used. This means that disc 21 extends only through an angle of 180°.

According to the already mentioned well-known equation the back focal distance $$s' = \frac{n \cdot R}{n-1}$$

in this embodiment $s'$ amounts to $1.33 R$ if $n$ equals 4.00, as has been presumed above. A second cylindrical half-disc 23 having a radius $r=0.33R$ can therefore be cemented directly to half-disc 21, if care is taken that the centers of the radii of both discs coincide.

In like manner as has been described with reference to FIG. 4 the cylindrical circumference of disc 23 is made opaque except for a narrow slot along the line where center plane 26 penetrates the cylindrical surface. A photoelectric receiver may be arranged behind this slot so as to cover it along its entire length. However, here again, the photoelectric receiver 25 may be prepared by cathodic sputtering directly on the surface 24 to assume the shape of the long and narrow slot (FIG. 3a). The use of high refractive index material is particularly advantageous because with these materials spherical aberrations are a minimum. Even with a relative aperture of 1:0.8 this image error will be negligibly small.

Further, it is of course advisable to provide in a manner known per se an antireflection coating on all glass surfaces through which light beams are transmitted. This coating is not only useful for preventing unnecessary reflection of a portion of the impinging light beams, but also serves to increase the available contrast.

FIG. 5 illustrates in what manner a fiber bundle known per se may be used for transmitting the light from the slot of the diaphragm to the photoelectric receiver. Basically, the FIGS. 5 and 5a show the embodiment also illustrated in FIGS. 3 and 3a. However, instead of the photoelectric receiver 25 being disposed adjacent the surface 24 like in FIG. 3 there is provided a fiber bundle 30. One end 30a of said fiber bundle is spread so that this end covers the slot in the surface 24. The other end 30b of the fiber bundle is rolled in a ropelike manner, and a photoelectric receiver 31 is placed adjacent this end 30b of the fiber bundle.

It is a particular advantage of this embodiment that the fiber bundle 30 can be designed practically as long as desired, and, further, that the photosensitive surface of the photoelectric receiver 31 need only be as large as the cross section of said bundle.

What I claim is:

1. A toric imaging lens with a center plane for slot sensors for satellites, comprising in combination:

a plane toric lens with boundary surfaces parallel and symmetric with said center plane and having a radius of rotation extending through an angle of 180°, said plane toric lens having a cylindrical recess concentric therewith, said recess having a slot diaphragm on said center plane; and a photoelectric receiver positioned in said center plane at the center of said radius of rotation.

2. The lens of claim 1, wherein said diaphragm is a transparent opening on an opaque wall on said cylindrical recess.

3. The lens of claim 1, wherein said toric lens comprises two toric semiring lenses having cylindrical inner surfaces and said slot diaphragm is a slit in a solid, semicircular support material.

4. A slot sensor according to claim 3, wherein said ring lenses are substantially of the following radii and spacings:
$n=1.5$

| $r_1$ | $=60$ | $d_1$ | $=10$ |
|---|---|---|---|
| $r_2$ (cylindrical) | $=50$ | $d_2$ (air) | $=1$ |
| $r_3$ | $=49$ | $d_3$ | $=9$ |
| $r_4$ (cylindrical) | $=40$ | $s'$ | $=29$ |